United States Patent
Di Pietro et al.

(10) Patent No.: US 12,363,012 B2
(45) Date of Patent: Jul. 15, 2025

(54) USING DEVICE BEHAVIOR KNOWLEDGE ACROSS PEERS TO REMOVE COMMONALITIES AND REDUCE TELEMETRY COLLECTION

(71) Applicant: Cisco Technology, Inc., San Jose, CA (US)

(72) Inventors: Andrea Di Pietro, Frejus (FR); Sukrit Dasgupta, Norfolk, MA (US); Sofia Karygianni, Dubendorf (CH)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/107,258

(22) Filed: Feb. 8, 2023

(65) Prior Publication Data
US 2024/0267308 A1    Aug. 8, 2024

(51) Int. Cl.
*H04L 43/062* (2022.01)
*H04L 41/16* (2022.01)
*H04L 43/04* (2022.01)

(52) U.S. Cl.
CPC ............ *H04L 43/062* (2013.01); *H04L 41/16* (2013.01); *H04L 43/04* (2013.01)

(58) Field of Classification Search
CPC ........ H04L 43/062; H04L 41/16; H04L 43/04
See application file for complete search history.

(56) References Cited

U.S. PATENT DOCUMENTS

| | | | |
|---|---|---|---|
| 10,726,428 B2 | 7/2020 | Asenjo et al. | |
| 10,873,983 B1* | 12/2020 | Patel | H04W 4/80 |
| 10,965,556 B2 | 3/2021 | Savalle et al. | |
| 11,258,673 B2 | 2/2022 | Vasseur et al. | |
| 11,451,456 B2 | 9/2022 | Tedaldi et al. | |
| 11,528,231 B2 | 12/2022 | Vasseur et al. | |
| 11,611,532 B1* | 3/2023 | Haefner | H04L 41/16 |
| 2017/0132853 A1* | 5/2017 | Matos | H04L 67/12 |
| 2017/0208151 A1 | 7/2017 | Gil et al. | |
| 2018/0284746 A1 | 10/2018 | Cella et al. | |
| 2020/0177485 A1* | 6/2020 | Shurtleff | H04L 41/142 |
| 2020/0403991 A1* | 12/2020 | Sohail | H04L 63/1433 |
| 2021/0344612 A1* | 11/2021 | Files | H04L 41/16 |

(Continued)

OTHER PUBLICATIONS

S. S. Deb and A. Munro, "Closing the Loop for Dynamic IP Qos Provisioning: A Case Study," 32nd IEEE Conference on Local Computer Networks (LCN 2007), Dublin, Ireland, 2007, pp. 368-375, doi: 10.1109/LCN.2007.56. (Year: 2007).*

(Continued)

*Primary Examiner* — Patrice L Winder
(74) *Attorney, Agent, or Firm* — BEHMKE INNOVATION GROUP LLC; James M. Behmke

(57) ABSTRACT

In one embodiment, a central agent obtains device inventory data from a plurality of networks regarding endpoint devices in those networks. The central agent receives a request for a behavioral model for a particular type of endpoint device. The central agent selects one or more networks of the plurality of networks to export traffic data associated with endpoint devices of the particular type. The central agent configures one or more export agents at the one or more networks to export the traffic data. The traffic data exported by the one or more export agents is used to train the behavioral model.

18 Claims, 8 Drawing Sheets

(56) References Cited

U.S. PATENT DOCUMENTS

| | | | |
|---|---|---|---|
| 2022/0138556 A1* | 5/2022 | Richardson | G06F 16/258 |
| | | | 706/25 |
| 2022/0210124 A1* | 6/2022 | Smith | H04L 67/10 |
| 2022/0294715 A1* | 9/2022 | Agrawal | H04L 43/04 |
| 2022/0294789 A1* | 9/2022 | Tikhomirov | H04L 63/102 |
| 2023/0006889 A1* | 1/2023 | Thyagaturu | H04L 41/5054 |
| 2023/0059038 A1* | 2/2023 | Sidhu | G06Q 30/0282 |
| 2023/0156038 A1* | 5/2023 | Konda | H04L 9/0643 |
| | | | 713/151 |
| 2024/0129761 A1* | 4/2024 | Byrne | H04L 41/147 |

OTHER PUBLICATIONS

Baig, Shuja-ur-Rehman, "Data Center's Telemetry Reduction and Prediction through Modeling Techniques", Doctoral Thesis, Sep. 2019, 115 pages, Department of Computer Architecture, Universitat Politécnica de Catalunya, UPC.

\* cited by examiner

USING DEVICE BEHAVIOR KNOWLEDGE ACROSS PEERS TO REMOVE COMMONALITIES AND REDUCE TELEMETRY COLLECTION

TECHNICAL FIELD

The present disclosure relates generally to computer networks, and, more particularly, to using device behavioral knowledge across peers to remove commonalities and reduce telemetry collection.

BACKGROUND

As machine learning techniques continue to advance, recent efforts have focused on applying these techniques to computer networks. For instance, machine learning techniques are now being researched for purposes of optimizing the performance of the network, detecting security threats, and the like. Many of these use cases rely on the creation of behavioral models for the various devices on the network that can be used to predict their networking needs, identify behavioral deviations which could be indicative of security concerns, and other purposes.

A key challenge with respect to behavioral modeling is that the performance of the behavioral model for any given device is contingent on the telemetry data collected regarding that device and used to train its behavioral model. For instance, simply collecting traffic telemetry for a device outside of business working hours could lead to a behavioral model for the device that performs poorly during business working hours. A naïve approach, thus, would be to collect every possible form of telemetry data regarding the device and at a very high frequency. However, in the networking space, this is often not possible, as the telemetry collection mechanism itself also consumes resources that could otherwise be devoted to conveying traffic to and from its constituent devise. For instance, reporting telemetry data to the cloud for model training could consume bandwidth that could otherwise be consumed by actual user traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
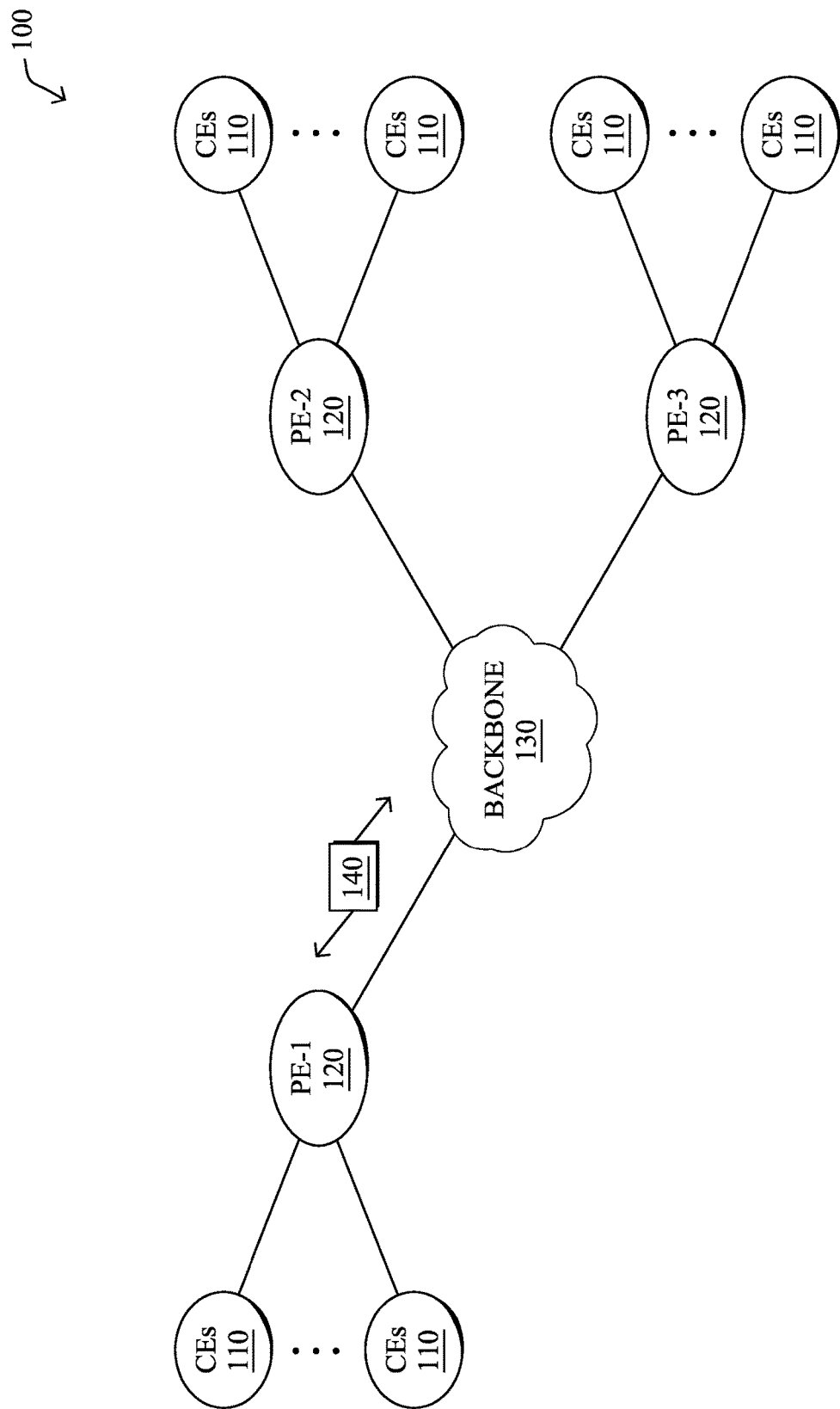
FIGS. 1A-1B illustrate an example communication network.

According to one or more embodiments of the disclosure, a central agent obtains device inventory data from a plurality of networks regarding endpoint devices in those networks. The central agent receives a request for a behavioral model for a particular type of endpoint device. The central agent selects one or more networks of the plurality of networks to export traffic data associated with endpoint devices of the particular type. The central agent configures one or more export agents at the one or more networks to export the traffic data. The traffic data exported by the one or more export agents is used to train the behavioral model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
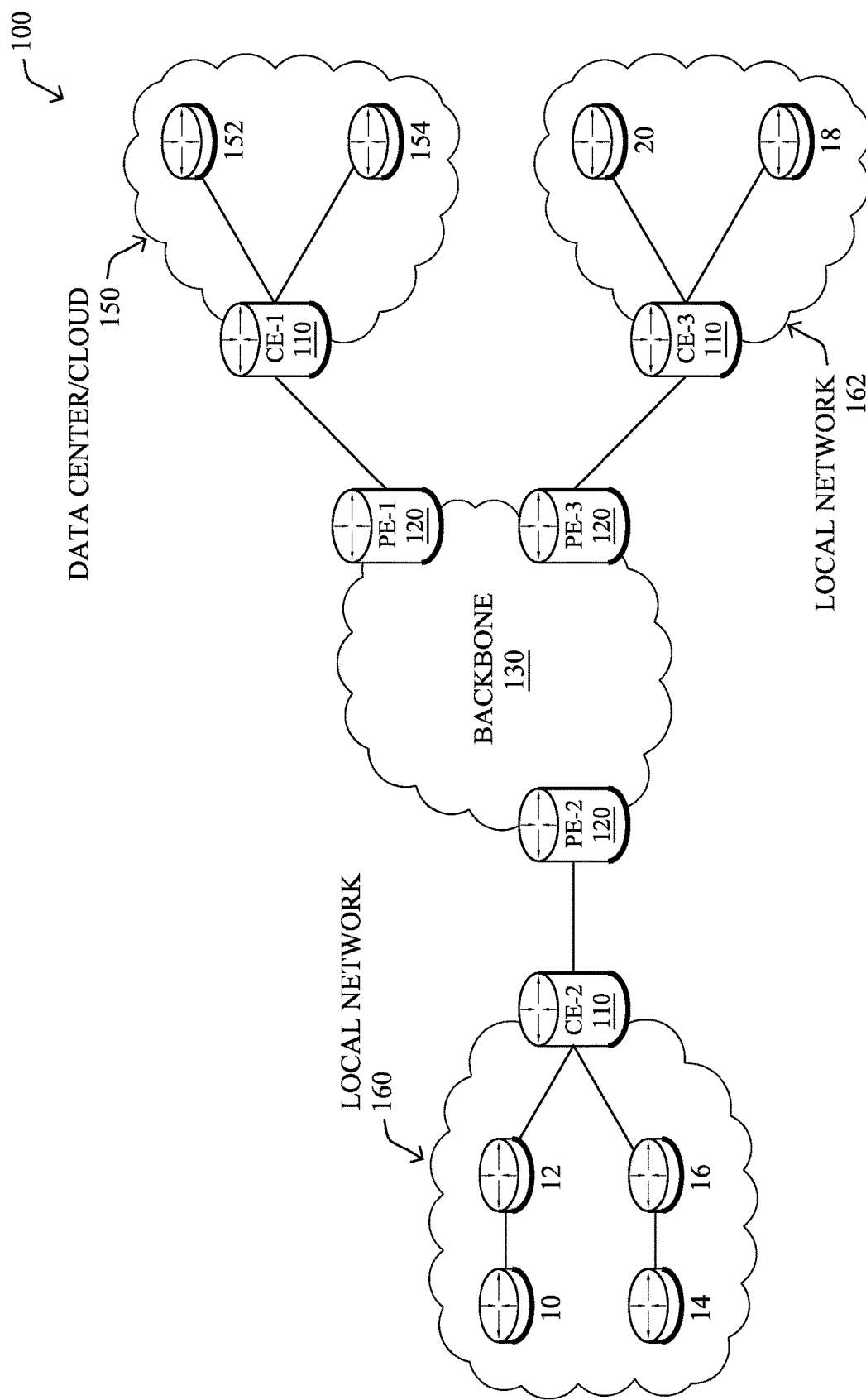

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
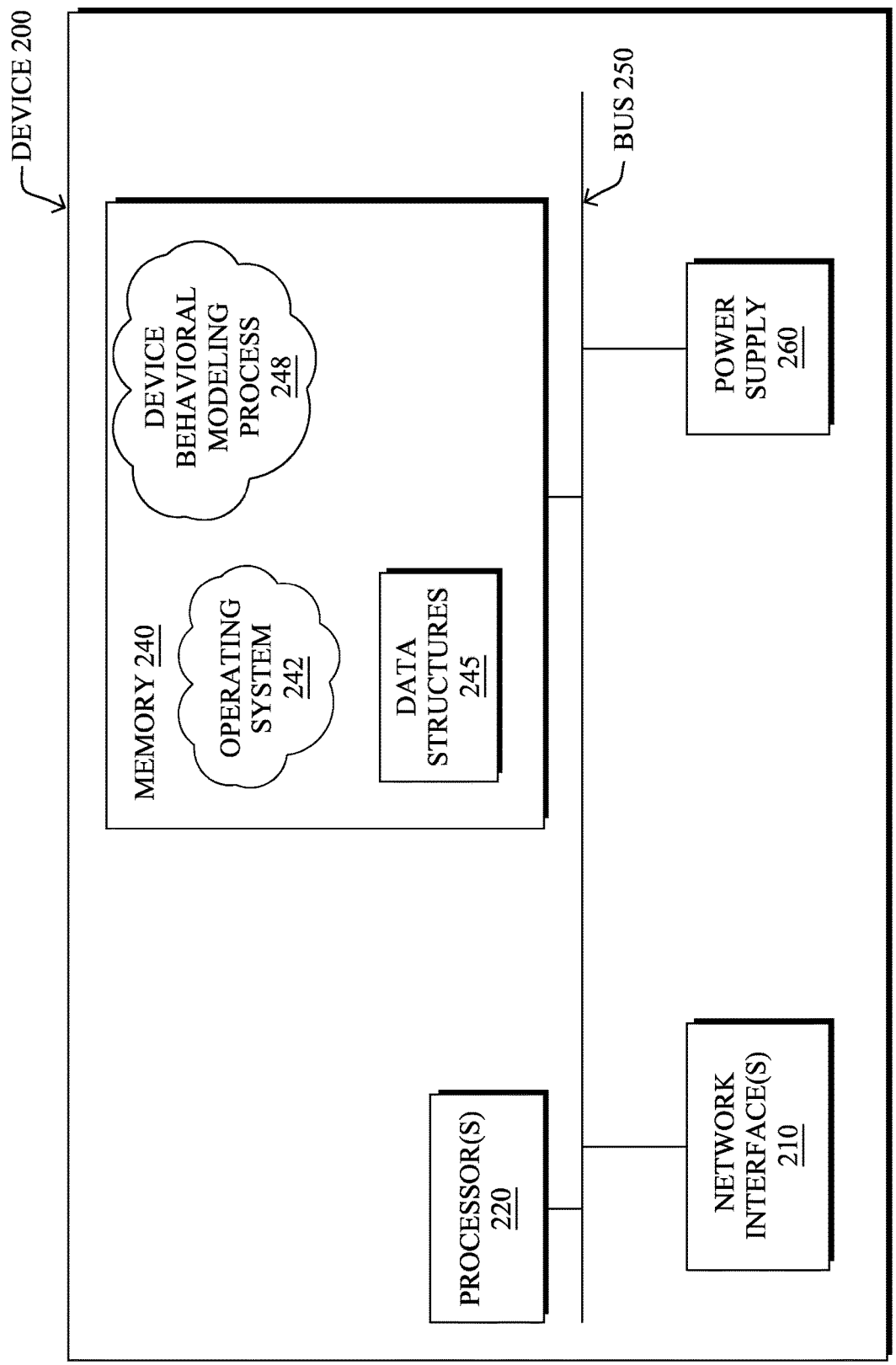
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device behavioral modeling process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, device behavioral modeling process 248 may include computer executable instructions that, when executed by processor(s) 220, cause device 200 to perform the techniques described herein. To do so, in some embodiments, device behavioral modeling process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, device behavioral modeling process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of a particular traffic pattern or other device behavior. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the device. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted a certain behavior of a given device. Conversely, the false negatives of the model may refer to the number of times the model failed to identify such a behavior. True negatives and positives may refer to the number of times the model correctly determined that the device will not exhibit a certain behavior or will exhibit that behavior, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, as machine learning techniques continue to advance, recent efforts have focused on applying these techniques to computer networks. For instance, machine learning techniques are now being researched for purposes of optimizing the performance of the network, detecting security threats, and the like. Many of these use cases rely on the creation of behavioral models for the various devices on the network that can be used to predict their networking needs, identify behavioral deviations which could be indicative of security concerns, and other purposes.

A key challenge with respect to behavioral modeling is that the performance of the behavioral model for any given device is contingent on the telemetry data collected regarding that device and used to train its behavioral model. For instance, simply collecting traffic telemetry for a device outside of business working hours could lead to a behavioral model for the device that performs poorly during business working hours. A naïve approach, thus, would be to collect every possible form of telemetry data regarding the device and at a very high frequency. However, in the networking space, this is often not possible, as the telemetry collection mechanism itself also consumes resources that could otherwise be devoted to conveying traffic to and from its constituent devise. For instance, reporting telemetry data to the cloud for model training could consume bandwidth that could otherwise be consumed by actual user traffic Using Device Behavioral Knowledge Across Peers to Remove Commonalities and Reduce Telemetry Collection The techniques herein help to reduce the telemetry collection needed to train a behavioral model by leveraging device inventory data across any number of different networks. In some aspects, this inventory data can be used centrally to make an optimized decision as to where and when to collect the telemetry data needed to train a behavioral model. This allows for the training of a behavioral model that still exhibits acceptable performance, while still reducing the resources consumed by the telemetry collection mechanism (e.g., network bandwidth, storage, etc.).

Illustratively, the techniques described herein may be performed by hardware, software, and/or firmware, such as in accordance with application experience 10 optimization process 248, which may include computer executable instructions executed by the processor 220 (or independent processor of interfaces 210) to perform functions relating to the techniques described herein.

Specifically, according to various embodiments, a central agent obtains device inventory data from a plurality of networks regarding endpoint devices in those networks. The central agent receives a request for a behavioral model for a particular type of endpoint device. The central agent selects one or more networks of the plurality of networks to export traffic data associated with endpoint devices of the particular type. The central agent configures one or more export agents at the one or more networks to export the traffic data. The traffic data exported by the one or more export agents is used to train the behavioral model.

Figure 3:
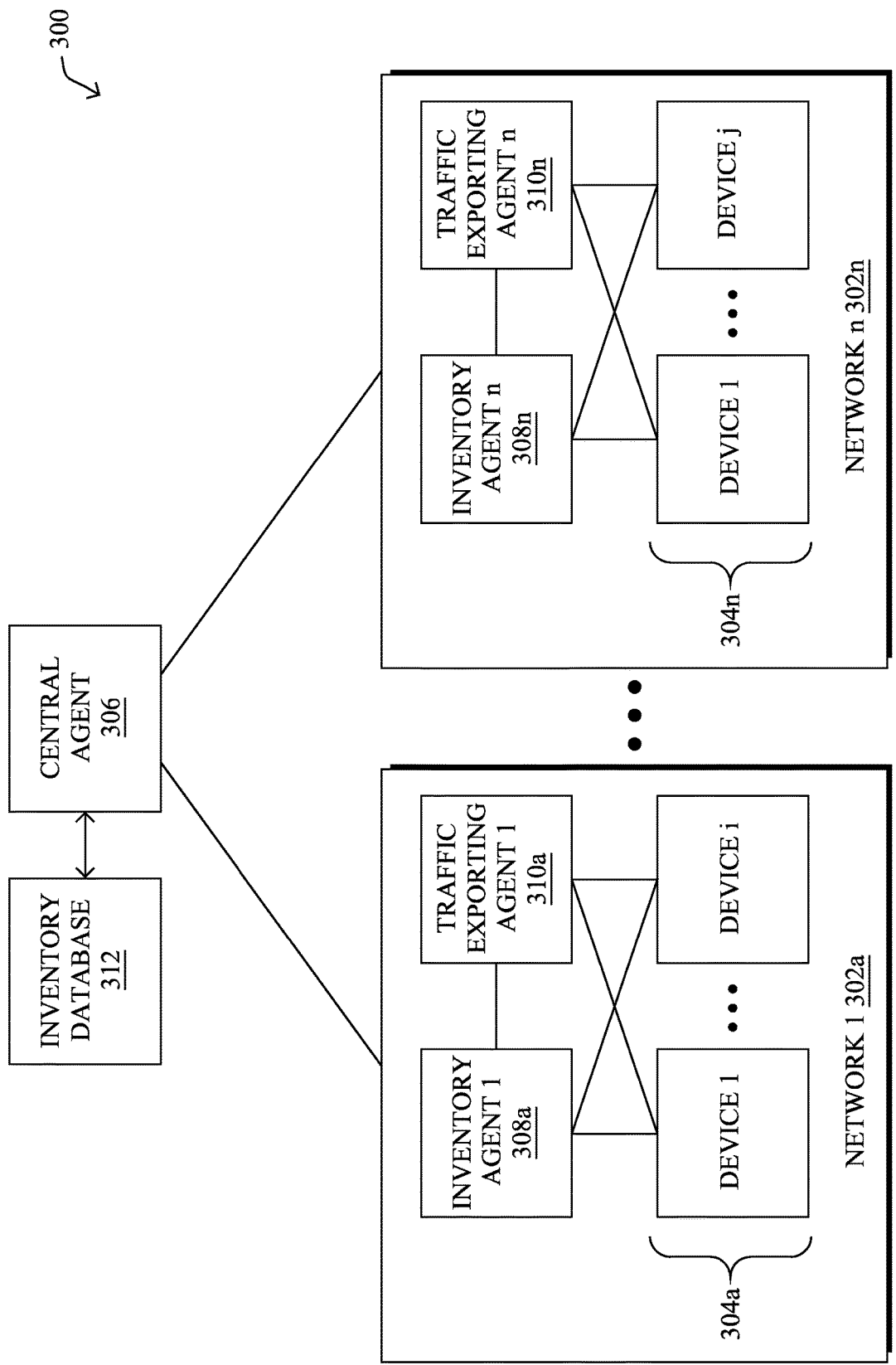
FIG. 3 illustrates an example architecture for using device behavioral knowledge across peers to remove commonalities and reduce telemetry collection.

Operationally, FIG. 3 illustrates an example architecture 300 for using device behavioral knowledge across peers to remove commonalities and reduce telemetry collection, according to various embodiments. As shown, assume that there is a plurality of different networks 302a-302n (e.g., a first through nh network). Such networks may be considered to be 'peers' in the sense that they are of similar types. For instance, networks 302a-302n may be operated by different entities (e.g., businesses, governments, schools, etc.). In some instances, the plurality of networks 302a-302n may be selected based on their sharing a common type (e.g., automotive factories, etc.), common geographic regions, a common service provider of networking services, or the like.

Regardless of the specific selection of networks 302a-302n, each of networks 302a-302n may comprise any number of constituent endpoint devices 304. For instance, as shown, network 302a may include i-number of devices 304a, whereas network 302n may include j-number of devices 304n. As would be appreciated, these devices may be of any number of different types including, but not limited to, end-user devices (e.g., personal computers, wearable devices, tablets, etc.), building automation equipment, office equipment (e.g., printers, fax machines, etc.), industrial equipment, and the like.

According to various embodiments, architecture 300 may include a central agent 306 that is communicatively coupled to networks 302a-302n. For instance, central agent 306 may be hosted in the cloud or a data center and communicate with networks 302a-302n via the Internet, MPLS connections, or one or more other WANs.

In addition to central agent 306, architecture 300 may also include a plurality of distributed agents located at each of networks 302a-302n, such as inventory agents 308a-308n and traffic exporting agents 310. For instance, network 302a may include inventory agent 308a and traffic exporting agent 310a, while network 302n may include inventory agent 308n and traffic exporting agent 310n. As would be appreciated, agents 306-310 may take the form of specifically configured devices (e.g., devices 200) through the execution of specialized instructions (device behavioral modeling process 248), to implement the techniques herein. For instance, in some implementations, inventory agents 308a-308n and traffic exporting agents 310a-310n may take the form of devices located at the edges of networks 302a-302n, such as CE routers/gateways or other devices in communication therewith. In addition, while inventory agents 308a-308n and traffic exporting agents 310a-310n are shown separately for illustrative purposes, their functionalities could be performed by singular devices.

In general, the role of inventory agents 308a-308n is to generate inventories of the various devices 304 in their respective networks 302 and report their inventory data to central agent 306, which may store this data in a centralized inventory database 312. Thus, central agent 306 may maintain and have access to a centralized repository of the various types of devices present across the entire set of networks 302a-302n. In various embodiments, central agent 306 may then leverage this inventory data to select which network(s) from among networks 302a-302n are to export telemetry data via their traffic exporting agents 310 for a particular type of device 304, which can then be used to train a behavioral model for that type of device.

Figure 4A:
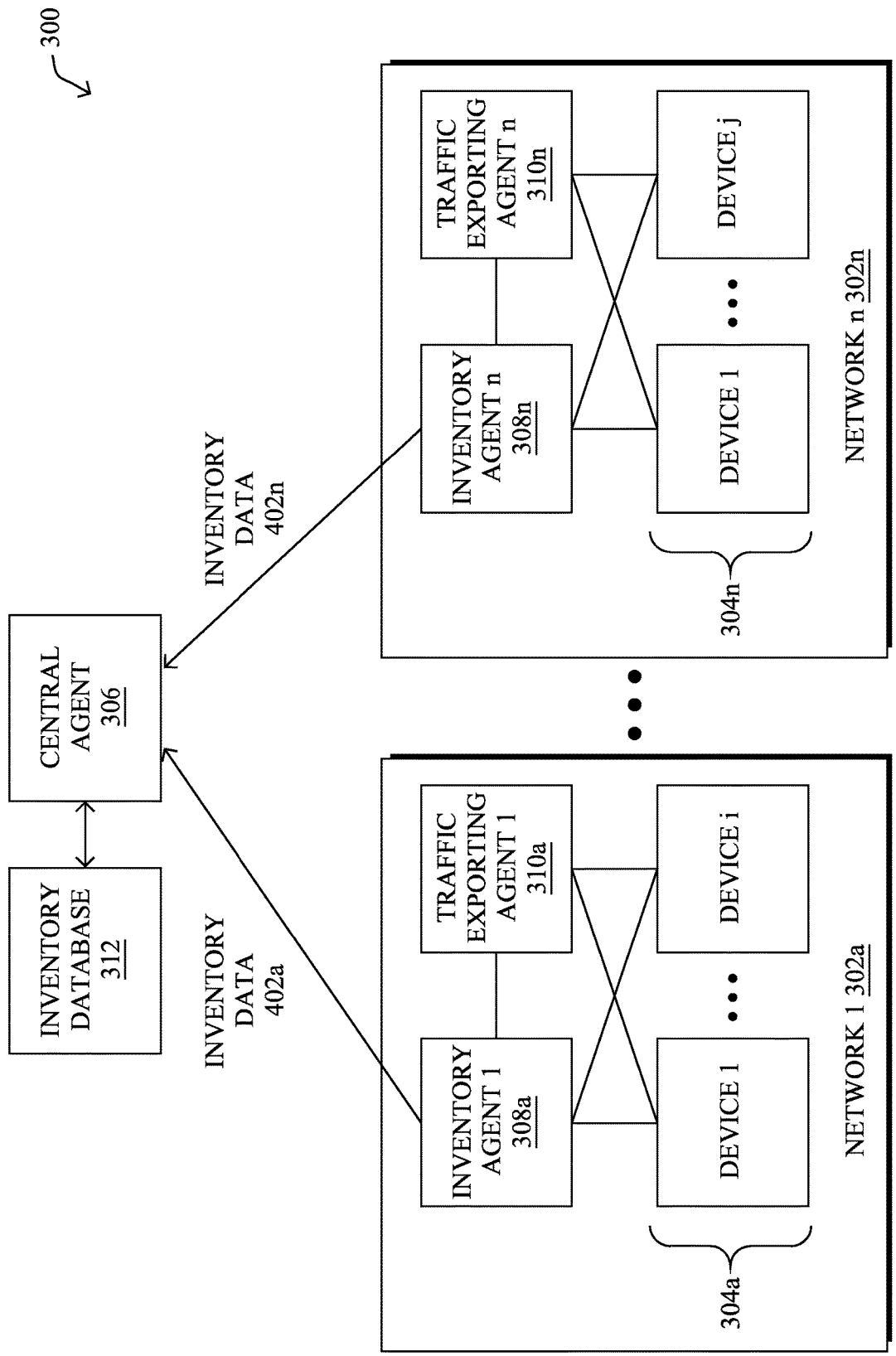
FIGS. 4A-4C illustrates an example of a central agent configuring the export of traffic data to train a device behavioral mode.
Figure 4B:
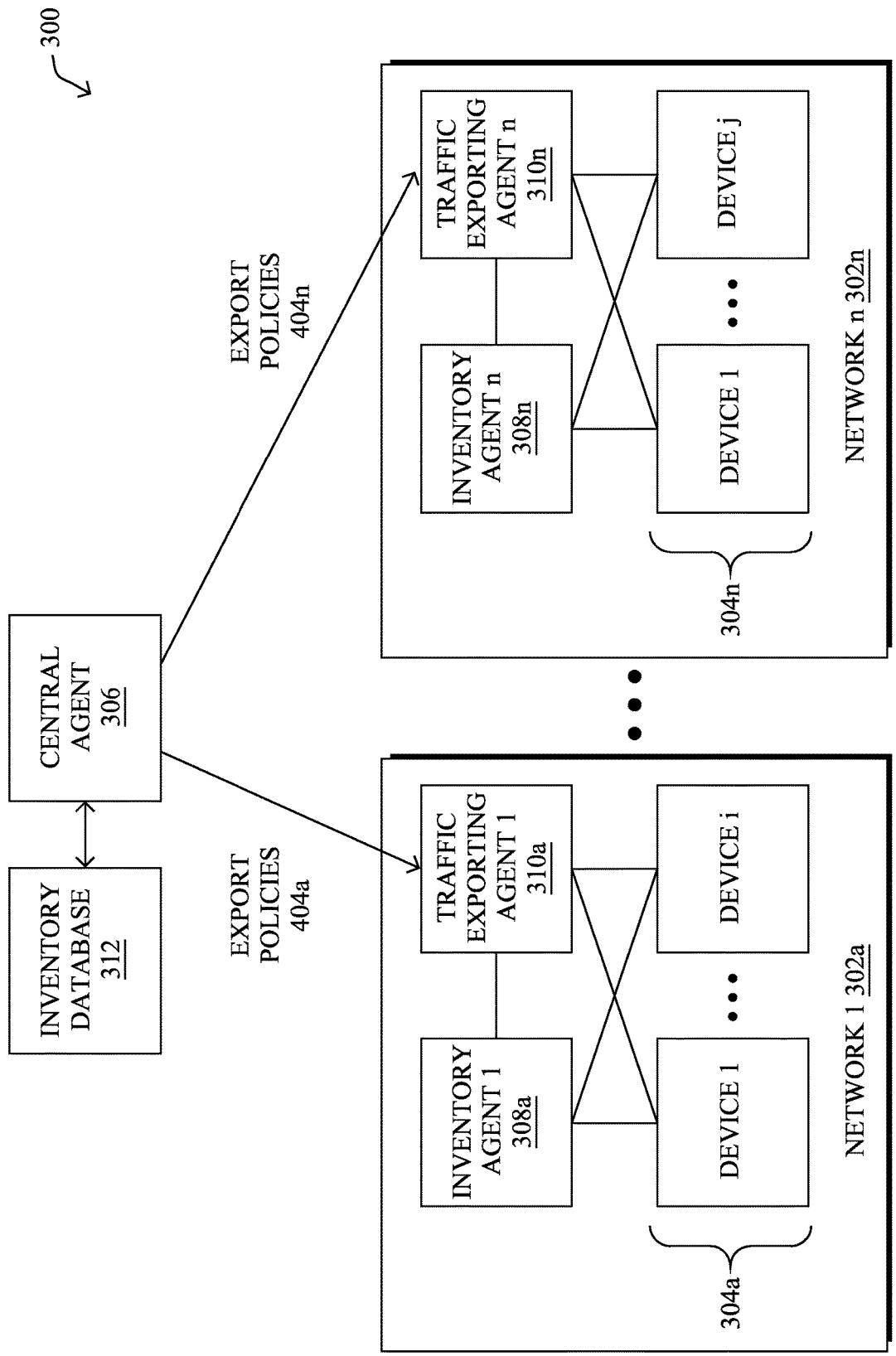
Figure 4C:
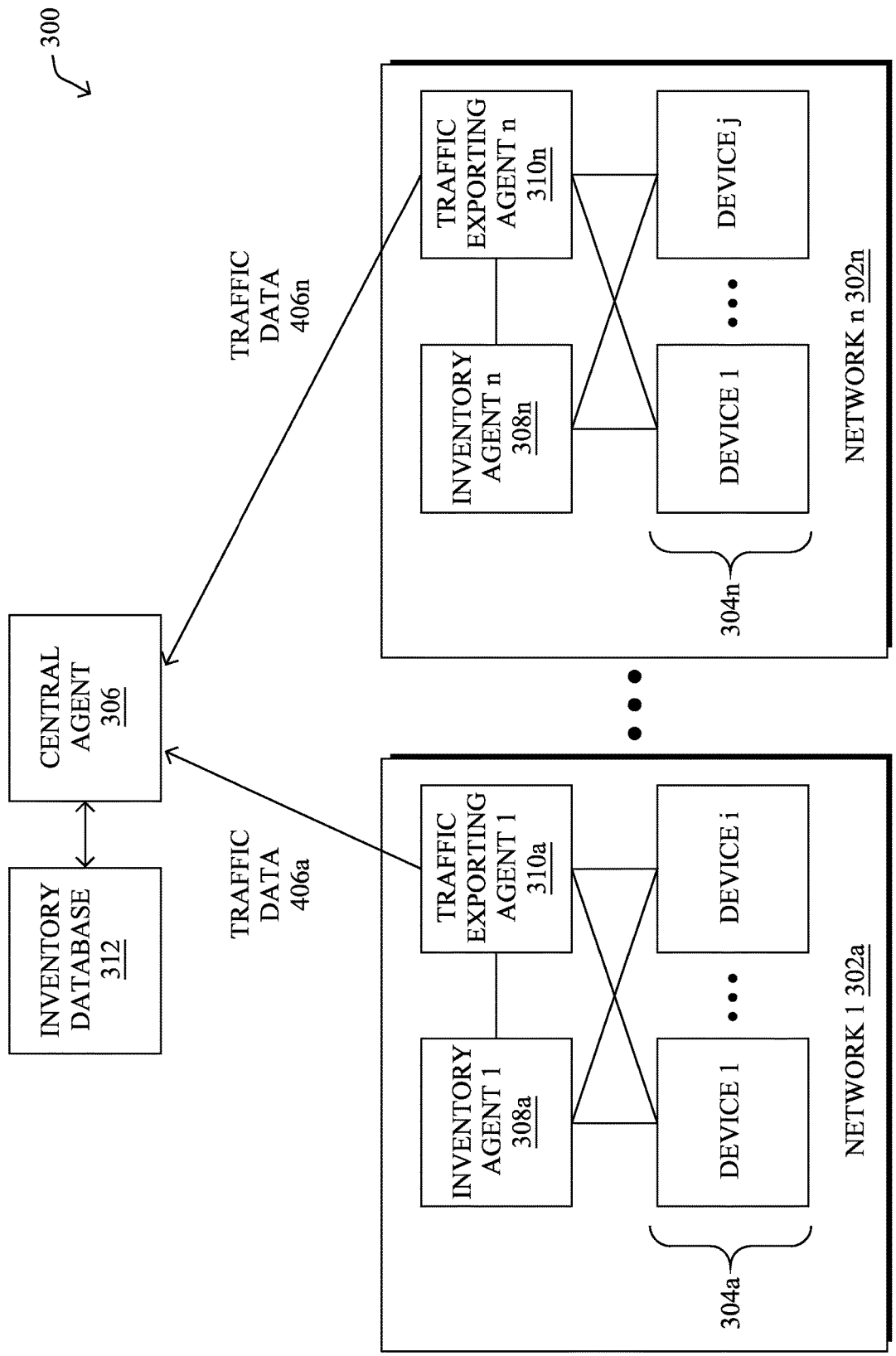

FIGS. 4A-4C illustrates an example of central agent 306 configuring the export of traffic data to train a device behavioral mode, according to various embodiments. As shown in FIG. 4A and continuing the example of FIG. 3, each of the inventory agents 308a-308n may generate inventory catalogs of the various device types present in their respective local networks 308a-308n. To do so, inventory agents 308a-308n may include or interact with deep packet inspection-based endpoint analytics components, leverage a device discovery protocol, such as the Network Discovery Protocol (NDP), or the like, to collect an inventory of the devices 304a-304n in their respective networks.

As shown, each inventory agent 308a-308n may respectively send inventory data 402a-402n to central agent 306 for analysis and storage in inventory database 312. Such messaging may be performed periodically, at predefined, or even on a pull basis whereby central agent 306 first request the data.

In various embodiments, inventory data 402a-402n may include any or all of the following, which central agent 306 may store in centralized inventory database 312:

A listing of the device types for which traffic was observed within its source network among networks 302a-302n.

A representation of the observed traffic for each device or device type. For instance, this may take the form of a statistical representation of the traffic, such a summarization vector whereby each dimension corresponds to an application or an application class). Several approaches could be leveraged to create such representations, ranging from simple multivariate histograms to more involved techniques such as autoencoders.

Resource information about the available resources at the source network among networks 302a-302n, such as its bandwidth, computing resources (e.g., of its traffic exporting agent 310a-310n, etc.).

The configuration of the local traffic exporting agent in the source network.

Any other information that central agent 306 may leverage to configure traffic exporting agents 310a-310n to collect and report traffic data that can be used to train a device behavioral model.

According to various embodiments, central agent 306 may leverage the information within centralized inventory database 312 to seek an optimal set of network(s) from among networks 302a-302n to export traffic data of a certain type. For instance, assume that central agent 306 receives a request to train a behavioral model for a particular type of endpoint device 304 (e.g., a particular brand and model of printer). In such a case, central agent 306 may leverage centralized inventory database 312 to generate an optimal set of export policies to be used by the traffic exporting agent(s) 310 in the selected network(s) 302. Thus, as a first filter, central agent 306 may exclude any networks from among networks 302a-302n that do not include any devices 304 of the type for which the behavioral model is to be generated. Then, central agent 306 may examine all of the inventory data available for the specified device type and create a set of policies ensuring the most complete as possible coverage of the network behavior of devices of that type from among the networks 302 that include devices 304 of that type.

In further embodiments, central agent 306 may also base its selection of network(s) 302a-302n in part on the resources available at networks 302a-302n for purposes of collecting and reporting traffic data associated with the device(s) 304 of the particular type.

For example, assume that central agent 306 receives a model request for a particular type of IP phone. In response, central agent 306 may first look up inventory information for such a device in inventory database 312, along with the corresponding summarized traffic information. Now, assume that traffic has been observed for that particular type of device in three networks: A, B, and C. On network A, the device(s) of that type were observed to communicate traffic with a set of applications X, while on networks B and C, devices of that type were observed to communicate with a set of applications Y. In such a case, central agent 306 may select network A, as well as either network B or network C, to export traffic data associated with devices of the particular type. To decide between network B and network C, central agent 306 may select the network that has the greater amount of resources available for traffic exporting.

In some instances, central agent 306 may also base its selection on how much information is already available for the requested device type from centralized inventory database 312. Indeed, as traffic data is collected and reported over time for that device type, central agent 306 may already have access to the needed training data and only configure the reporting of traffic data that has not already been reported. For instance, say traffic samples are already available for traffic between devices of the particular type and application set X, but not for application set Y, which was observed in network D. In such a case, central agent 306 may opt to only configure the traffic exporting agent of network D for traffic associated with devices of the particular type and application set Y. Consequently, central agent 306 will eventually have access to traffic data for devices of the particular type and both application sets X and Y, on which a behavioral model can be trained.

In some embodiments, another factor that central agent 306 may take into account when selecting the network(s) to export the traffic data for the particular type of device are any preexisting configurations for their respective traffic exporting agents. For instance, there may be existing prohibitions on certain types of traffic data from being exported. In such cases, central agent 306 may also exclude from consideration those networks whose configurations prohibit exportation of the needed traffic data.

As shown in FIG. 4B, central agent 306 may then send one or more export policies 404 to the network(s) from among networks 302a-302n that configure their respective traffic exporting agents 310 to export traffic data for devices of the particular type to central agent 306. In various embodiments, an export policy 404 may specify any or all of the following for a given traffic exporting agent 410:

The device(s) 304 in the local network whose traffic data is to be exported. For instance, the export policy 404 may configure the exporting of traffic data for all devices 304 in the local network of the particular type, a particular device 304 of the particular type, or a subset of the devices 304 in the local network of the particular type.

The application(s) associated with the traffic data to be monitored and exported. For instance, an export policy 404 may only request traffic data associated with those devices 304 of the particular type and one or more specified applications. Thus, traffic data associated with those devices communicating with other applications does not need to be captured or reported, in such instances.

The reporting and/or collection frequency for the traffic data. In some instances, this may also include an expiration time and/or data for the export of the traffic data, as well.

Whether the traffic data to be reported may be aggregated or reported in raw form. For instance, it may be sufficient to simply report on aggregated statistics or heuristics over a defined time period (e.g., hourly counts or averages, etc.).

A maximum export rate or value that caps the bandwidth consumption by the exports within any given time period.

Note that the export policies 404 may be sent either directly to their target traffic exporting agents 310 or indirectly, such as by central agent 306 sending the export policies 404 to the inventory agents 308 in the selected network(s) 302, which then use them to configure their corresponding traffic exporting agents 310, accordingly.

As shown in FIG. 4C, once the traffic exporting agents 310 in the selected networks 302 have been configured using the traffic export policies 404 generated by central agent 306, they may begin collecting and reporting the configured traffic data 406 to central agent 306, in accordance with those policies. For instance, say that traffic export policies 404a sent to traffic exporting agent 310a in network 302a configures traffic exporting agent 310a to export traffic data 406a to central agent 306 for a particular type of IP phone in devices 304a. In such a case, traffic data 406a may include raw or aggregated traffic data observed in network 302a for those types of devices. In turn, central agent 306 may use this information to train a behavioral model for those types of IP phones.

In some instances, rather than central agent 306 having prior knowledge of the allowable export actions for any given network 302a-302n, the receiving traffic exporting agent 310 may instead accept or reject an export policy 404 from 306 and notify it, accordingly. In such instances, central agent 306 may iteratively attempt to configure suitable traffic exporting agents 310 until a suitable set has accepted.

As would be appreciated, central agent 306 may send traffic exporting policies 404 to any given traffic exporting agent 310 in other situations, as well, using the above techniques (e.g., outside of a request for a particular behavioral model). For instance, say a new network is onboarded (e.g., a network 302 outside of the set of networks 302a-302n) that may offer more diverse data than is currently available (e.g., new device types, new application traffic for a given device type, etc.). In such a case, central agent 306 may proactively configure export policies for the traffic exporting agent at the new network, to capture such information.

In addition, central agent 306 may also compute and send out export policies based on any changes to centralized inventory database 312. For instance, if a particular type of device 304 is later added to network 302a that was not present before, central agent 306 may determine that network 302a is the better selection to export traffic data for that device type and send out new export policies, accordingly.

In a further embodiment, a given export policy may also include one or more stopping conditions for the capture and export of the traffic data. In general, such stopping conditions may be used to reduce or even stop the export of the traffic data, once enough data has been collected by the system. For instance, one such stopping condition may be temporal in nature, indicating that traffic exporting agent 310 should cease its capture and/or exporting functions after a certain amount of time has taken place, when a certain point in time has been reached, or the like. In other cases, the stopping condition may specify one or more characteristics of the exported traffic data, such as an amount or volume of the exported traffic data. Alternatively, central agent 306 may simply re-configure the traffic exporting agent 310 to stop the data export, when such a stopping condition is met.

Of course, whenever an export policy is changed for any given traffic exporting agent 310, central agent 306 or the affected traffic exporting agents 310 may send a notification to one or more users. This may prevent, for instance, a network administrator from believing the configuration changes to be misconfigurations. In one embodiment, there may also be a feedback mechanism to override this approach if the user knows that there will be new hardware being introduced or a new software update to be rolled out on existing hardware components, for instance.

Figure 5:
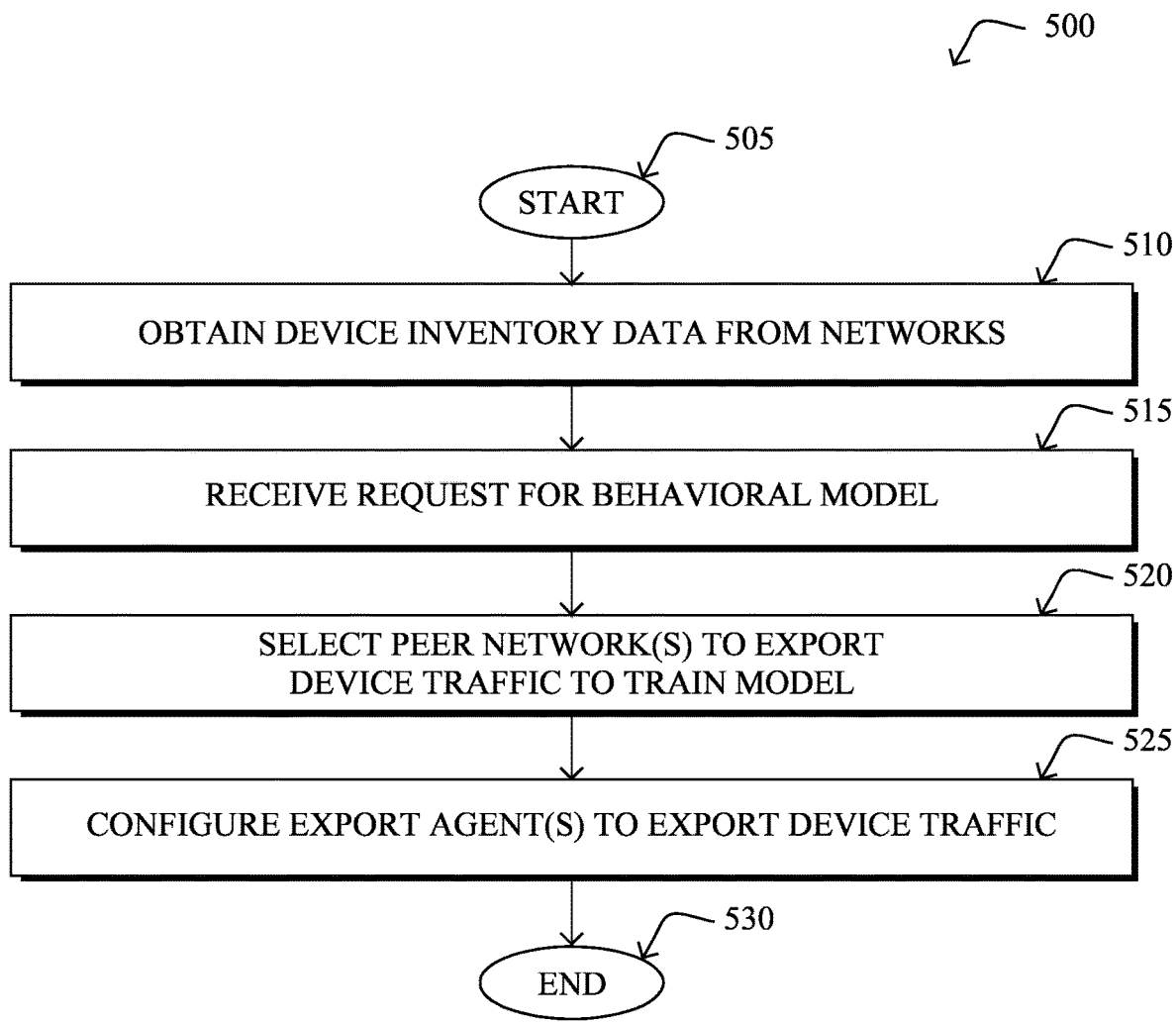
FIG. 5 illustrates an example simplified procedure for using device behavioral knowledge across peers to remove commonalities and reduce telemetry collection.

FIG. 5 illustrates an example simplified procedure 500 (i.e., a method) for using device behavioral knowledge across peers to remove commonalities and reduce telemetry collection, in accordance with one or more embodiments described herein. For example, a non-generic, specifically configured device (e.g., device 200) may perform procedure 500 by executing stored instructions (e.g., application experience optimization process 248), to function as a central agent. The procedure 500 may start at step 505, and continues to step 510, where, as described in greater detail above, the central agent may obtain device inventory data from a plurality of networks regarding endpoint devices in those networks. In various embodiments, the plurality of networks are operated by different entities (e.g., schools, governments, businesses, etc.). In some embodiments, the device inventory data indicates, for any given endpoint device, its device type and a representation of its observed traffic. In some embodiments, the device inventory data indicates, for any given endpoint device, one or more applications associated with that endpoint device.

At step 515, as detailed above, the central agent may receive a request for a behavioral model for a particular type of endpoint device.

At step 520, the central agent may select one or more networks of the plurality of networks to export traffic data associated with endpoint devices of the particular type, as described in greater detail above. In some embodiments, the central agent may do so by determining whether at least some of the traffic data has already been collected from the plurality of networks. In further embodiments, the central agent may do so by determining whether any given network in the plurality of networks exporting the traffic data would violate an export policy associated with that network. In another embodiment, the central agent may do so by excluding at least one of the plurality of networks from the one or more networks selected to export the traffic data based on its endpoint devices of the particular type having an associated application that is also associated with those endpoint devices in the one or more networks selected to export the traffic data. In a further embodiment, the one or more networks are selected based in part on resources available at those one or more networks for exporting traffic data.

At step 525, as detailed above, the central agent may configure one or more export agents at the one or more networks to export the traffic data, wherein the traffic data exported by the one or more export agents is used to train the behavioral model. In some embodiments, the central agent may also use the traffic data exported by the one or more export agents to train the behavioral model for the particular type of endpoint device. In additional embodiments, the central agent may also configure an export agent for a network that is not in the plurality of networks to export traffic data for endpoint devices that would add diversity to traffic data previously received by the apparatus from the plurality of networks. In yet another embodiment, the device may also configure the one or more export agents to stop exporting the traffic data when a stopping condition is met (e.g., after a certain amount of data has been collected and exported, after a certain amount of time, etc.).

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using device behavioral knowledge across peers to remove commonalities and reduce telemetry collection, it is to be understood that various other adaptations and modifications may be made within the spirit and scope of the embodiments herein. For example, while certain embodiments are described herein with respect to using certain models for purposes of predicting the traffic behaviors of certain devices, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a central agent, device inventory data from a plurality of networks regarding endpoint devices in those networks;
   receiving, at the central agent, a request for a behavioral model for a particular type of endpoint device;

selecting, by the central agent, one or more networks of the plurality of networks to export traffic data associated with endpoint devices of the particular type by determining whether a given network in the plurality of networks exporting the traffic data would violate an export policy associated with the given network that prohibits one or more types of traffic from being exported; and configuring, by the central agent, one or more export agents at the one or more networks to export the traffic data, wherein the traffic data exported by the one or more export agents is used to train the behavioral model.

2. The method as in claim 1, wherein the device inventory data indicates, for any given endpoint device, its device type and a representation of its observed traffic.

3. The method as in claim 1, further comprising:
using the traffic data exported by the one or more export agents to train the behavioral model for the particular type of endpoint device.

4. The method as in claim 1, wherein selecting the one or more networks to export traffic data associated with endpoint devices of the particular type comprises:
determining that at least some of the traffic data has already been collected from the plurality of networks.

5. The method as in claim 1, wherein the device inventory data indicates, for any given endpoint device, one or more applications associated with that endpoint device.

6. The method as in claim 5, wherein selecting the one or more networks to export traffic data associated with endpoint devices of the particular type comprises:
excluding at least one of the plurality of networks from the one or more networks selected to export the traffic data based on its endpoint devices of the particular type having an associated application that is also associated with those endpoint devices in the one or more networks selected to export the traffic data.

7. The method as in claim 1, wherein the one or more networks are selected based in part on resources available at those one or more networks for exporting traffic data.

8. The method as in claim 1, further comprising:
configuring an export agent for a network that is not in the plurality of networks to export traffic data for endpoint devices that would add diversity to traffic data previously received by the central agent from the plurality of networks.

9. The method as in claim 1, wherein the plurality of networks are operated by different entities.

10. An apparatus, comprising:
one or more network interfaces;
a processor coupled to the one or more network interfaces and configured to execute one or more processes; and
a memory configured to store a process that is executable by the processor, the process when executed configured to:
obtain device inventory data from a plurality of networks regarding endpoint devices in those networks;
receive a request for a behavioral model for a particular type of endpoint device;
select one or more networks of the plurality of networks to export traffic data associated with endpoint devices of the particular type by determining whether a given network in the plurality of networks exporting the traffic data would violate an export policy associated with the given network that prohibits one or more types of traffic from being exported; and; and
configure one or more export agents at the one or more networks to export the traffic data, wherein the traffic data exported by the one or more export agents is used to train the behavioral model.

11. The apparatus as in claim 10, wherein the device inventory data indicates, for any given endpoint device, its device type and a representation of its observed traffic.

12. The apparatus as in claim 10, wherein the process when executed is further configured to:
use the traffic data exported by the one or more export agents to train the behavioral model for the particular type of endpoint device.

13. The apparatus as in claim 10, wherein the apparatus selects the one or more networks to export traffic data associated with endpoint devices of the particular type by:
determining that at least some of the traffic data has already been collected from the plurality of networks.

14. The apparatus as in claim 10, wherein the device inventory data indicates, for any given endpoint device, one or more applications associated with that endpoint device.

15. The apparatus as in claim 14, wherein the apparatus selects the one or more networks to export traffic data associated with endpoint devices of the particular type by:
excluding at least one of the plurality of networks from the one or more networks selected to export the traffic data based on its endpoint devices of the particular type having an associated application that is also associated with those endpoint devices in the one or more networks selected to export the traffic data.

16. The apparatus as in claim 10, wherein the apparatus configures the one or more export agents to stop exporting the traffic data when a stopping condition is met.

17. The apparatus as in claim 10, wherein the process when executed is further configured to:
configure an export agent for a network that is not in the plurality of networks to export traffic data for endpoint devices that would add diversity to traffic data previously received by the apparatus from the plurality of networks.

18. A tangible, non-transitory, computer-readable medium storing program instructions that cause a central agent to execute a process comprising:
obtaining, by the central agent, device inventory data from a plurality of networks regarding endpoint devices in those networks;
receiving, at the central agent, a request for a behavioral model for a particular type of endpoint device;
selecting, by the central agent, one or more networks of the plurality of networks to export traffic data associated with endpoint devices of the particular type by determining whether a given network in the plurality of networks exporting the traffic data would violate an export policy associated with the given network that prohibits one or more types of traffic from being exported; and; and
configuring, by the central agent, one or more export agents at the one or more networks to export the traffic data, wherein the traffic data exported by the one or more export agents is used to train the behavioral model.

* * * * *